United States Patent
Kanno et al.

(10) Patent No.: US 8,345,330 B2
(45) Date of Patent: Jan. 1, 2013

(54) DOCUMENT READING APPARATUS

(75) Inventors: Akiko Kanno, Kashiwa (JP); Nobuo Sekiguchi, Moriya (JP); Shigemichi Hamano, Abiko (JP); Kenji Morita, Toride (JP); Youhei Kattou, Matsudo (JP); Satoshi Seki, Toride (JP); Akira Morisawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 12/577,375

(22) Filed: Oct. 12, 2009

(65) Prior Publication Data

US 2010/0103484 A1    Apr. 29, 2010

(30) Foreign Application Priority Data

Oct. 24, 2008   (JP) ................... 2008-274349

(51) Int. Cl.
*H04N 1/46* (2006.01)
(52) U.S. Cl. ........ 358/505; 358/518; 358/497; 358/496; 382/162; 399/408
(58) Field of Classification Search .............. 358/505, 358/518, 497, 496, 448, 504, 524, 1.16; 382/162, 382/165; 399/408, 193, 82
See application file for complete search history.

(56) References Cited

U.S. PATENT DOCUMENTS

| | | | | |
|---|---|---|---|---|
| 4,926,251 A | * | 5/1990 | Sekizawa et al. | 358/535 |
| 5,121,195 A | * | 6/1992 | Seki et al. | 358/515 |
| 5,130,791 A | * | 7/1992 | Abe | 358/518 |
| 5,187,570 A | * | 2/1993 | Hibi et al. | 358/520 |
| 5,198,909 A | * | 3/1993 | Ogiwara et al. | 358/412 |
| 5,255,063 A | * | 10/1993 | Ideyama et al. | 399/301 |
| 5,343,312 A | * | 8/1994 | Hibi et al. | 358/520 |
| 5,398,117 A | * | 3/1995 | Suzuki et al. | 358/451 |
| 5,897,251 A | * | 4/1999 | Kato et al. | 399/408 |
| 6,512,899 B2 | * | 1/2003 | Shimada et al. | 399/82 |
| 6,621,922 B2 | * | 9/2003 | Takaragi et al. | 382/162 |
| 6,927,877 B2 | * | 8/2005 | Kanno et al. | 358/3.1 |
| 7,307,762 B2 | * | 12/2007 | Yaguchi | 358/444 |
| 7,471,426 B2 | * | 12/2008 | Ide et al. | 358/474 |
| 7,532,348 B2 | * | 5/2009 | Yaguchi | 358/1.15 |
| 7,864,386 B2 | * | 1/2011 | Tanimoto et al. | 358/496 |
| 7,889,917 B2 | * | 2/2011 | Minamino | 382/162 |
| 8,144,375 B2 | * | 3/2012 | Tanimoto et al. | 358/474 |
| 2002/0175971 A1 | * | 11/2002 | Otsuki | 347/43 |
| 2003/0112475 A1 | | 6/2003 | Shoda | |
| 2004/0174575 A1 | * | 9/2004 | Ide et al. | 358/505 |

FOREIGN PATENT DOCUMENTS

| | | |
|---|---|---|
| JP | 2002-247290 A | 8/2002 |
| JP | 2006-086629 A | 3/2006 |

* cited by examiner

*Primary Examiner* — Negussie Worku
(74) *Attorney, Agent, or Firm* — Canon U.S.A., Inc., IP Division (57) ABSTRACT

In reading an image of a document in a monochromatic document reading mode, a document reading apparatus reads the image of the document while conveying the document at a speed determined according to a variable magnification ratio, executes digital variable magnification on the read multivalued image in a main scanning direction by using a main scanning direction variable magnification unit, binarizes the multivalued image, and stores the binary image on a memory. In reading an image in a color document reading mode, the document reading apparatus reads the image of the document while conveying the document at a predetermined speed, stores the read multivalued image on the memory, and executes digital variable magnification on the multivalued image in the main scanning direction and a sub scanning direction.

16 Claims, 10 Drawing Sheets

FIG. 7A
MULTIVALUED IMAGE (100%)

FIG. 7B
MULTIVALUED IMAGE - MAGNIFIED

FIG. 7C
BINARY IMAGE (100%)

FIG. 7D
BINARY IMAGE - MAGNIFIED

DOCUMENT READING APPARATUS

BACKGROUND OF THE INVENTION

1. Field of the Invention

The present invention relates to a document reading apparatus operating in a monochromatic document reading mode and a color document reading mode and configured to execute variable magnification processing on a read document image.

2. Description of the Related Art

Recently, Japanese Patent Application Laid-Open No. 2002-247290 has discussed a document reading apparatus having a four-line sensor, which includes a monochromatic document reading line sensor in addition to a conventional color document reading three-line sensor. The document reading apparatus discussed in Japanese Patent Application Laid-Open No. 2002-247290 is intended to both read a monochromatic document at a high speed and read a color document with a high image quality.

The above-described type of document reading apparatus outputs an image signal from the monochromatic document reading line sensor by using two channels including an odd-numbered pixel output channel and an even-numbered pixel output channel. With this configuration, the above-described type of conventional document reading apparatus can increase the reading productivity of the monochromatic document reading line sensor twice as high as that of the line sensor for color document reading. Accordingly, the conventional document reading apparatus described above can read a large number of monochromatic documents in a short period of time.

In a document reading apparatus capable of reading monochromatic documents at a high speed, the following problems may arise. The difference of the levels of productivity or the start-up timings may appear between the document reading apparatus and an image forming apparatus in transmitting image data from the document reading apparatus which executes high-speed document reading, to an image forming apparatus such as a printer.

If the productivity of the document reading apparatus is higher than that of the image forming apparatus or if the document reading start timing of the document reading apparatus is earlier than that of the image forming apparatus, then it becomes necessary to temporarily store the image data of the read document on a memory.

In reading monochromatic documents at a high speed and temporarily storing the read image data on a memory, it is necessary to temporarily store image data of a larger number of pages than in the case of reading color documents. In order to address this, Japanese Patent Application Laid-Open No. 2006-086629 discusses the following method. More specifically, the method discussed in Japanese Patent Application Laid-Open No. 2006-086629 binarizes multivalued image data of monochromatic documents and stores the binary data on a memory. On the other hand, the multivalued image data of color documents is stored as it is (without binarizing the same) on a memory.

Accordingly, the method discussed in Japanese Patent Application Laid-Open No. 2006-086629 can store image data of a large number of pages by binarizing and storing image data of monochromatic documents, which primarily include text data, on a memory having a limited capacity.

However, in executing magnification or reduction (hereinafter simply referred to as "variable magnification") on the monochromatic images, if the binary image stored on the memory is digitally variable-magnified by interpolating or thinning out the same, then image degradation, which includes a phenomenon of step-like difference on an edge of the image or image blur, may occur.

In order to suppress image degradation and address the above-described problem, it may be effective to execute variable magnification scanning, in which variable magnification in the sub scanning direction is executed by reading a document while conveying the document at a speed appropriate for the variable magnification ratio.

However, if the variable magnification scanning is executed in reading a color document, color misregistration may occur in the image due to vibration that may occur in driving the optical system at a low speed during enlargement processing.

SUMMARY OF THE INVENTION

The present invention is directed to a document reading apparatus capable of storing a large number of document images and executing variable magnification while suppressing image degradation in a monochromatic document reading mode and also capable of executing variable magnification while suppressing image degradation that may occur due to color misregistration in a color document reading mode.

According to an aspect of the present invention, a document reading apparatus includes a reading unit configured to read an image of a document and output multivalued data of the read image of the document, a moving unit configured to relatively move the document and the reading unit, and a control unit configured, in reading an image of the document in a monochromatic document reading mode, to execute variable magnification in a direction of the relative movement by causing the reading unit to read the document while the moving unit relatively moves the document and the reading unit at a speed determined according to a variable magnification ratio, and configured, in reading an image of the document in a color document reading mode, to execute variable magnification on data output from the reading unit by causing the reading unit to read the document while the moving unit relatively moves the document and the reading at a predetermined speed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Figure 1:
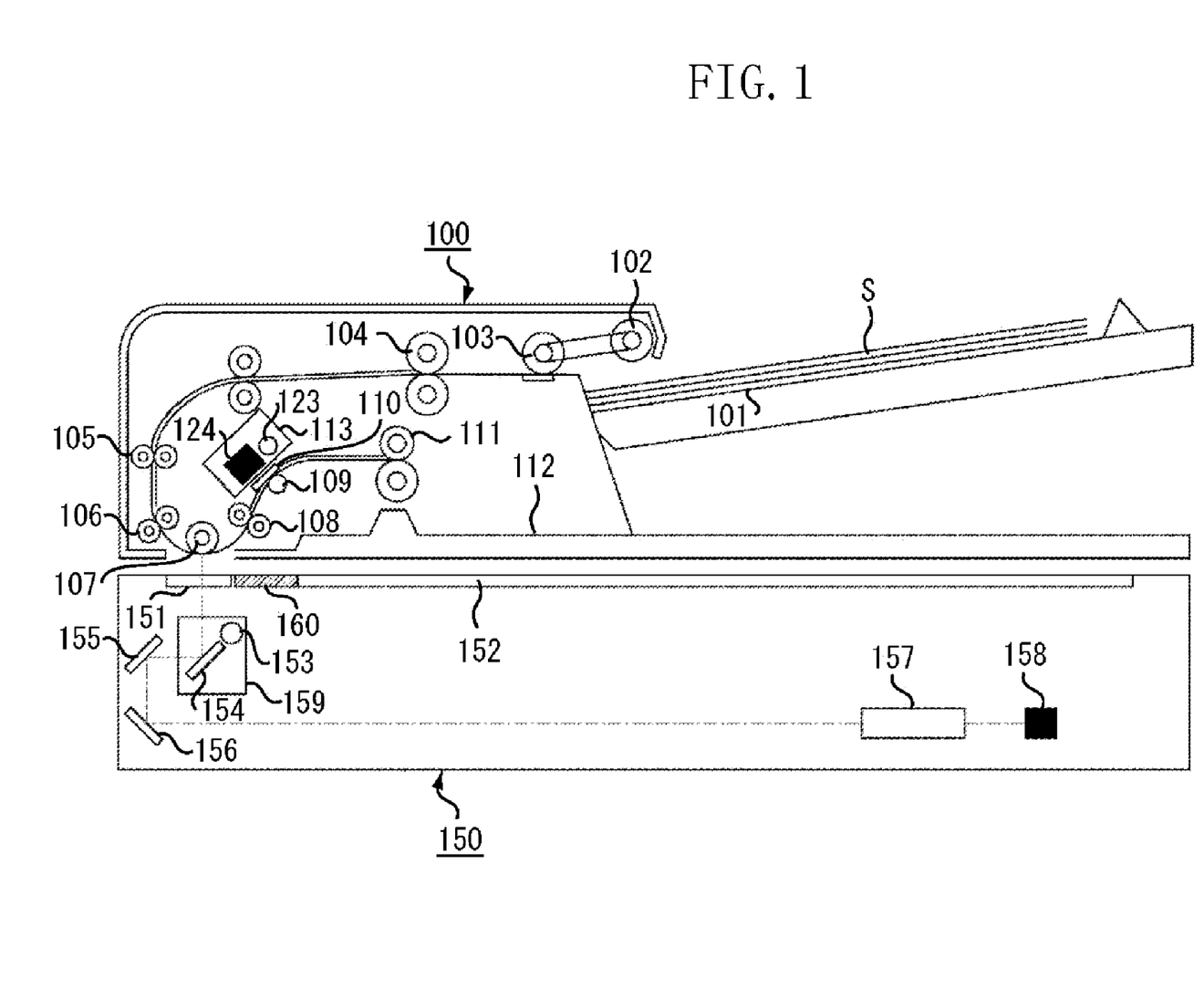
FIG. 1 is a cross section of an auto document feeder (ADF) and a reader unit constituting a document reading apparatus according to an exemplary embodiment of the present invention.

FIG. 1 is a cross section of an ADF 100 and a reader unit 150, which constitutes a document reading apparatus according to an exemplary embodiment of the present invention. Referring to FIG. 1, the ADF 100 includes an elevatable document tray 101 and a pick-up roller 102. A user of the document reading apparatus can place a document bundle S, which includes one or more document sheets, on the elevatable document tray 101. The pick-up roller 102 descends onto the document bundle S and rotates thereon to feed the document.

One sheet of the document fed by the pick-up roller 102 is separated by a separation roller 103 and then is conveyed by a conveyance roller pair 104. The document conveyed by the conveyance roller pair 104 then contacts a registration roller 105, which is not rotating at this timing. With this configuration, the present exemplary embodiment can prevent the phenomenon of skewed document feeding.

After that, the registration roller 105 starts to rotate. Then, the document is conveyed from the registration roller 105 onto a document feeding-reading glass 151 via a document feeding roller 106 and a reading roller 107, which contacts the document feeding-reading glass 151. The document feeding roller 106 and the reading roller 107 rotate to move the document on the document feeding-reading glass 151.

A reader unit 150 reads an image of a front surface of the document being conveyed on the document feeding-reading glass 151 at a predetermined conveyance speed. The conveyance speed will be described in detail below. In addition, the document passes through a conveyance roller 108 and between a document reading roller 109 and a document moving glass 110. The document is then discharged by a document discharge roller 111 onto a document discharge tray 112. The conveyance roller 108 and the document reading roller 109 move the document along the document moving glass 110.

A lamp 123 and a back surface image reading unit 113 are provided in a conveyance path from the document feeding-reading glass 151 to the document discharge roller 111. The lamp 123 irradiates an image of the back surface of the document with light. The back surface image reading unit 113 includes a four-line sensor 124. The four-line sensor will be described in detail below.

To briefly describe here the four-line sensor 124 of the back surface image reading unit 113, the four-line sensor 124 reads an image of the back surface of the document conveyed and moved along the document moving glass 110 while the lamp 123 is lit.

The reader unit 150 includes the document feeding-reading glass 151, a platen glass 152, a scanner unit (including a lamp 153 and a mirror 154) 159, mirrors 155 and 156, a lens 157, and a four-line sensor 158.

In reading the image of the front surface of the document conveyed on and along the document feeding-reading glass 151, the lamp 153 is lit while the scanner unit 159 is staying stationary below the document feeding-reading glass 151. Furthermore, the four-line sensor 158 reads the image of the document that moves relative to the four-line sensor 158.

In reading the document placed on the platen glass 152, which is a document placing plate, the scanner unit 159 relatively moves along the platen glass 152 while the lamp 153 is being lit. Thus, the image of the document is read.

A white plate 160 is used as a reference of the white level to correct shading in an optical system. More specifically, the lamp 153 is lit while the scanner unit 159 stays stationary below the white plate 160. The four-line sensor 158 reads the white plate 160 in this state. The result of reading the white plate 160 is used as the reference data.

Figure 2:
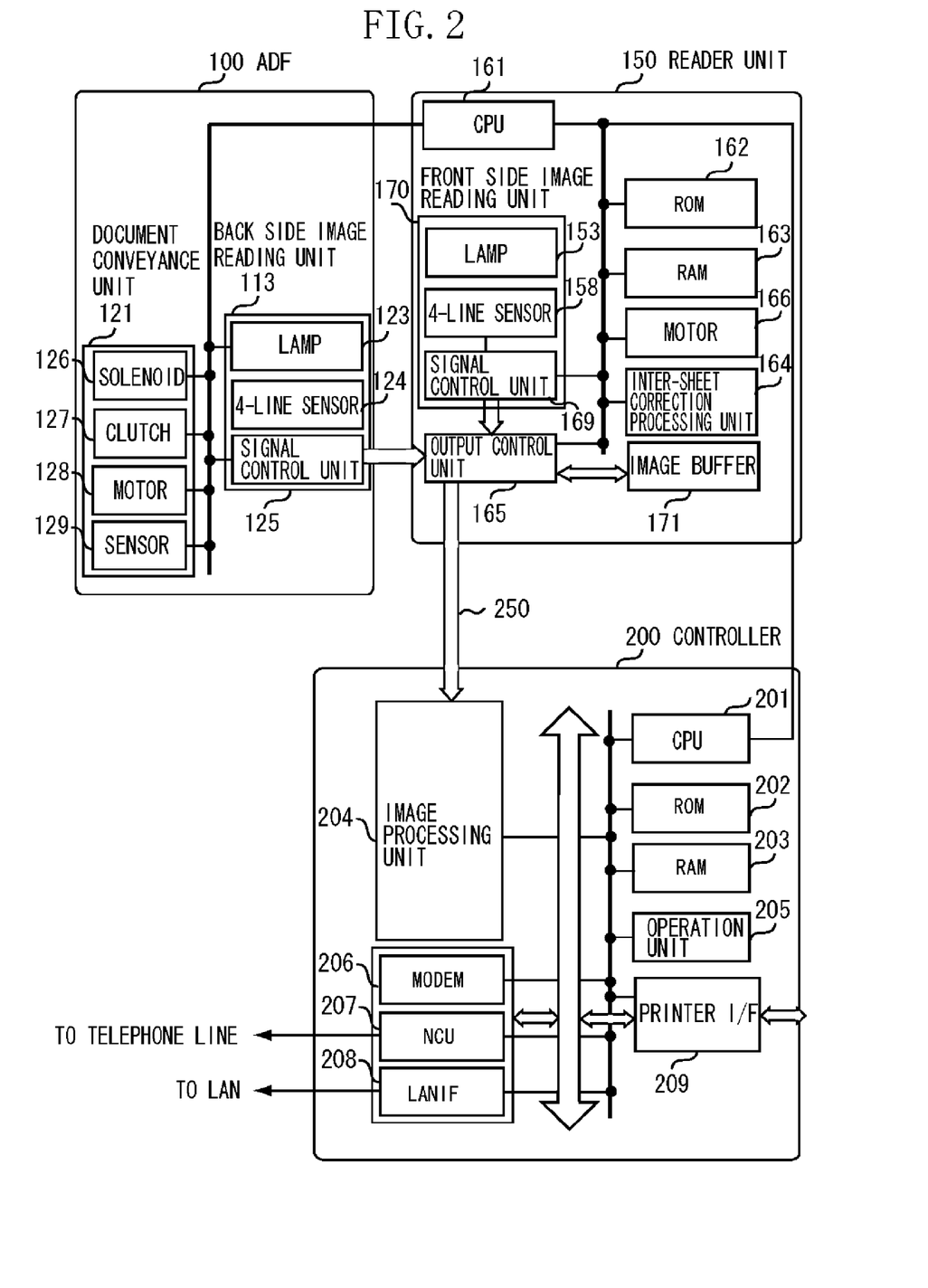
FIG. 2 is a control block diagram illustrating the ADF, the reader unit, and an image controller according to an exemplary embodiment of the present invention.

FIG. 2 is a control block diagram illustrating an example of the ADF 100, the reader unit 150, and an image controller 200 of the document reading apparatus according to the present exemplary embodiment.

Referring to FIG. 2, a central processing unit (CPU) 161 of the reader unit 150 executes control of the ADF 100 and the reader unit 150. A program read-only memory (ROM) 162, which stores a program according to the present exemplary embodiment, and a random access memory (RAM) 163, which is used as a work area of the CPU 161, are connected to the CPU 161.

The ROM 162 stores a control program for controlling the reader unit 150 and the ADF 100. The RAM 163 stores input data and work data used in the control.

A motor 166 drives a motor that moves the optical system including the scanner unit 159. The reader unit 150 includes a front surface image reading unit 170. The front surface image reading unit 170 includes the lamp 153, the four-line sensor 158, and a signal control unit 169. The signal control unit 169 converts an output from the four-line sensor 158 into a digital image signal.

The CPU 161 controls the motor 166 and the front surface image reading unit 170 to cause the reader unit 150 to read a document image.

An inter-sheet correction processing unit 164 corrects parameters used in the signal control unit 169 in a gap between the conveyed document sheets. An output control unit 165 transfers the image signal read by the front surface image reading unit 170 and the back surface image reading unit 113, which will be described in detail below, to the image controller 200. The image signal is transferred via an image buffer 171 where necessary. The ADF 100 includes a document conveyance unit 121 and the back surface image reading unit 113.

A motor 128, a solenoid 126, and a clutch 127, which are used for driving a document conveyance roller, are connected to an output port of the CPU 161.

Moreover, various sensors 129, which are used in generating a document conveyance timing signal, are connected to an input port of the CPU 161. The CPU 161 controls the output port according to the control program stored on the ROM 162 and causes the ADF 100 to convey the document.

In addition, the ADF 100 transmits an image top signal to the reader unit 150 via a communication line. An "image top signal" refers to a signal that indicates a leading edge portion of the document image data. The "image top signal" is used as a reference for the image data leading edge, which is the basis of determining the image reading timing.

The back surface image reading unit 113 includes the lamp 123, the four-line sensor 124, and a signal control unit 125. The back surface image reading unit 113 transfers the read image of the back surface of the document to the output control unit 165.

The image data read by the four-line sensors 158 and 124 and converted into a digital image signal by the signal control units 169 and 125 is then temporarily stored on the image buffer 171 via the output control unit 165.

The image data stored on the image buffer 171 is sequentially read by the output control unit 165 in synchronization with output timing. The read image data is then transferred to the controller unit 200 via the controller I/F 250. Furthermore, the image top signal, which is the reference of the leading edge portion of the document image data, is transmitted to the controller unit 200 from the CPU 161.

The controller 200 includes a CPU 201, a ROM 202, and a RAM 203. The image data that has been transmitted from the output control unit 165 to the image controller 200 is then subjected to image processing by an image processing unit 204. The user can issue an instruction by operating an operation unit 205.

The CPU 201 outputs the image data to a printer (not illustrated) via a printer interface (I/F) 209 according to the user instruction issued via the operation unit 205. In addition, the CPU 201 transmits image data modulated by a modem 206 from a network control unit (NCU) 207 to an external communication line. Further, the CPU 201 transfers the image data to other apparatuses or personal computer (PC)s via a local area network (LAN) interface 208. Furthermore, the CPU 201 issues a command for executing an operation and processing necessary to execute the function designated by the user via the operation unit 205 to the CPU 161 of the reader unit 150.

Figure 3:
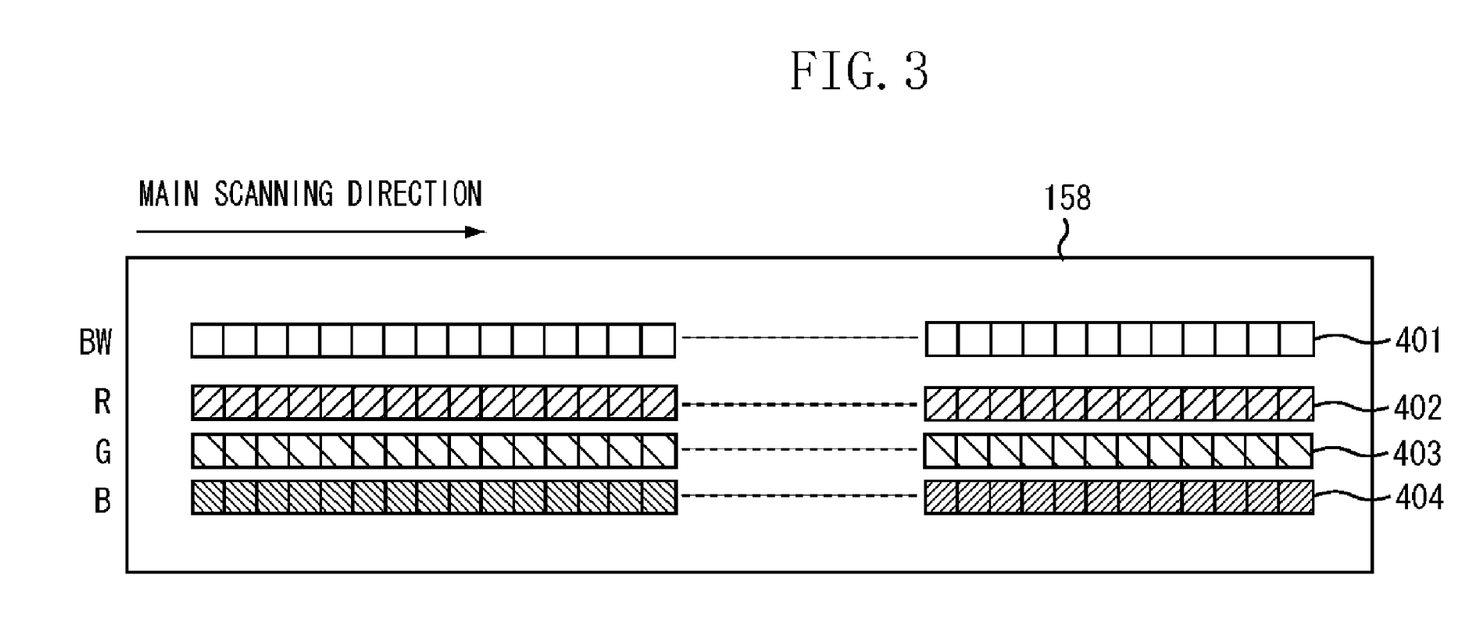
FIG. 3 illustrates an exemplary configuration of a four-line sensor according to an exemplary embodiment of the present invention.

FIG. 3 illustrates an exemplary configuration of the four-line sensor 158. In the present exemplary embodiment, the four-line sensor 124 has the same configuration as that of the four-line sensor 158.

Referring to FIG. 3, in a light receiving portion of the four-line sensor 158, one monochromatic line sensor BW and three color line sensors, namely, red (R), green (G), and blue (B) line sensors, are provided in parallel to one another along a main scanning direction (a direction perpendicular to the direction of the relative movement of the document against the four-line sensor 158).

Each line sensor includes a predetermined number of light-sensitive elements of a predetermined dimension. One light-sensitive element is equivalent to one pixel.

The color line sensor R includes a color separation filter on the light-sensitive element. Only a red cycle component of the irradiated light, transmits through the color separation filter. The line sensor R receives the red frequency component and outputs a corresponding image signal. Similarly, the color line sensors G and B receives only a corresponding green or blue color frequency component and output a corresponding image signal.

On the other hand, no color separation filter is provided to the monochromatic line sensor BW. Accordingly, the amount of light received by the monochromatic line sensor BW is larger than the amount of light received by the color line sensor having the above-described color separation filter. Therefore, the time necessary for the monochromatic line sensor BW to read one line becomes short. Thus, the monochromatic line sensor BW can read a document at a high speed.

The four-line sensor 158 includes an image reading sensor, such as a charge-coupled device (CCD) sensor or a complementary metal oxide semiconductor (CMOS) sensor.

Figure 4:
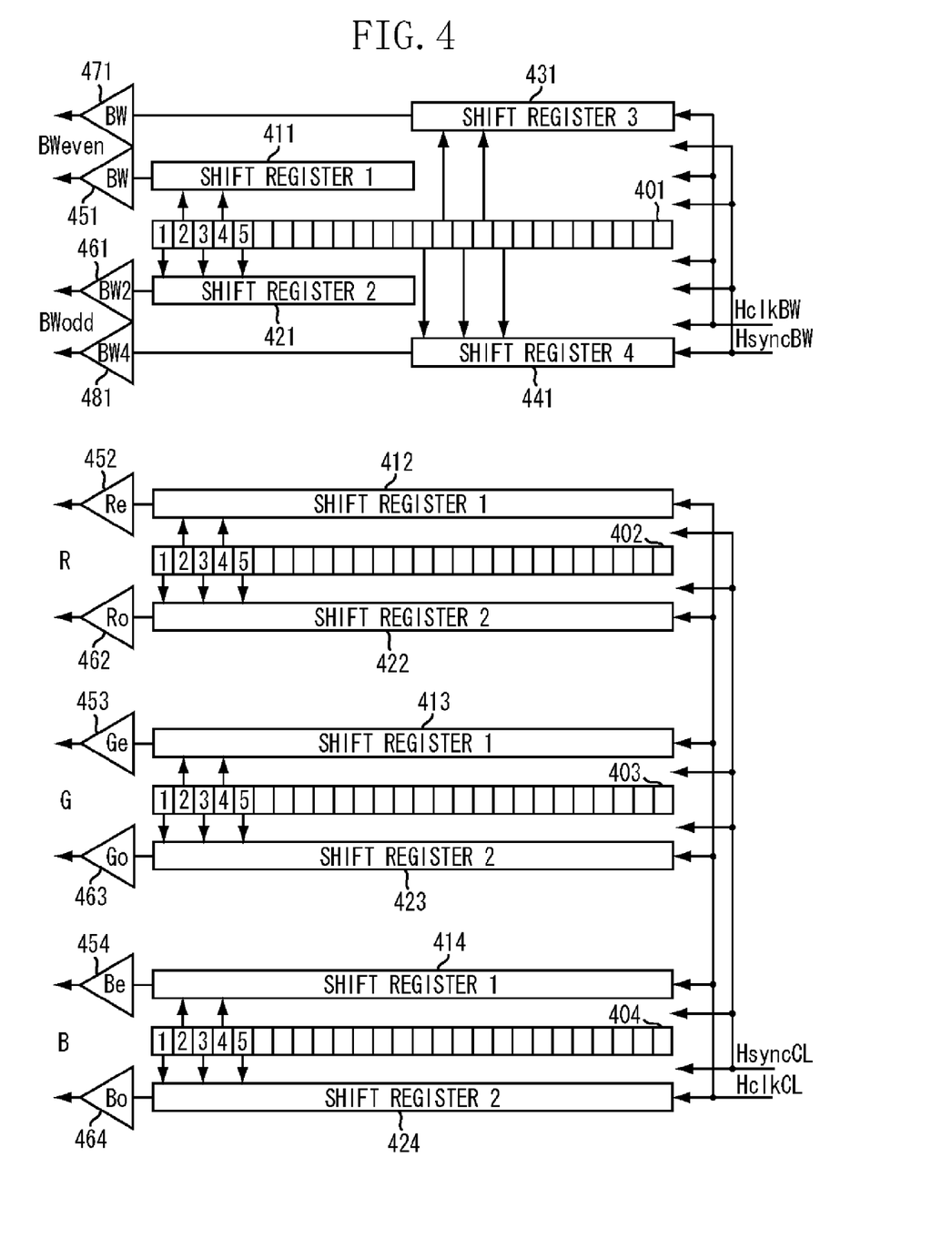
FIG. 4 illustrates an exemplary configuration of the four-line sensor for outputting an image signal according to an exemplary embodiment of the present invention.

FIG. 4 illustrates an exemplary configuration of the four-line sensor 158 for outputting an image signal. In the present exemplary embodiment, the four-line sensor 124 has the same configuration as that of the four-line sensor 158.

Referring to FIG. 4, each time a horizontal synchronization signal HsyncCL is input, charges of odd-numbered pixels are transferred from color line sensors 402 through 404 to shift registers 422 through 424. Similarly, charges of even-numbered pixels are transferred from color line sensors 402 through 404 to shift registers 412 through 414 each time a horizontal synchronization signal HsyncCL is input.

The charges transferred to the shift registers 412 through 414 and 422 through 424 are horizontal-transferred by an image clock HclkCL. One pixel is output for each clock via output buffers 452 through 454 and 462 through 464.

On the other hand, a monochromatic line sensor 401 is connected to four shift registers. Charges of odd-numbered pixels are transferred to shift registers 421 and 441 by a horizontal synchronization signal HsyncBW. Similarly, charges of even-numbered pixels are transferred to shift registers 411 and 431 by the horizontal synchronization signal HsyncBW.

The first half of the odd-numbered pixels is horizontal-transferred by the shift register 421 while the latter half thereof is horizontal-transferred by the shift register 441. Similarly, the first half of the even-numbered pixels is horizontal-transferred by the shift register 411 while the latter half thereof is horizontal-transferred by the shift register 431.

The charges from the shift register 411, 421, 431, and 441 are horizontal-transferred by an image clock HclkBW. One pixel is output for each clock via output buffers 451, 461, 471, and 481.

If the cycles of the image clock HclkCL and the image clock HclkBW are the same, the amount of transfer of the monochromatic image signal output in the above-described manner is twice as large as that of the color image signal. Accordingly, the monochromatic image signal can be completely horizontal-transferred within a time period half that of the color image signal.

Accordingly, if the frequency of the horizontal synchronization signal HsyncBW is set at a level half that of the horizontal synchronization signal HsyncCL and if the conveyance speed (scanning speed) of a monochromatic document is set at a level twice as high as that of a color document, then an image of a monochromatic document can be read at a speed twice as high as the color document image reading speed.

The accumulation time for the monochromatic line sensor BW may become half that of the color line sensor. However, the monochromatic line sensor BW can receive a sufficient amount of light because the monochromatic line sensor BW does not include a color separation filter. Accordingly, the monochromatic line sensor BW can output a sufficient quantity of image signals.

If the cycle of the image clock HclkBW is set lower than half of the image clock HclkCL, then the transfer quantity of the monochromatic image signals becomes twice as great or greater than that of the color image signals. Accordingly, in this case, if the conveyance speed (scanning speed) of a monochromatic document is set at a level twice as high or higher than that of a color document, then an image of a monochromatic document can be read at a speed twice as high or higher than the color document image reading speed.

Figure 5:
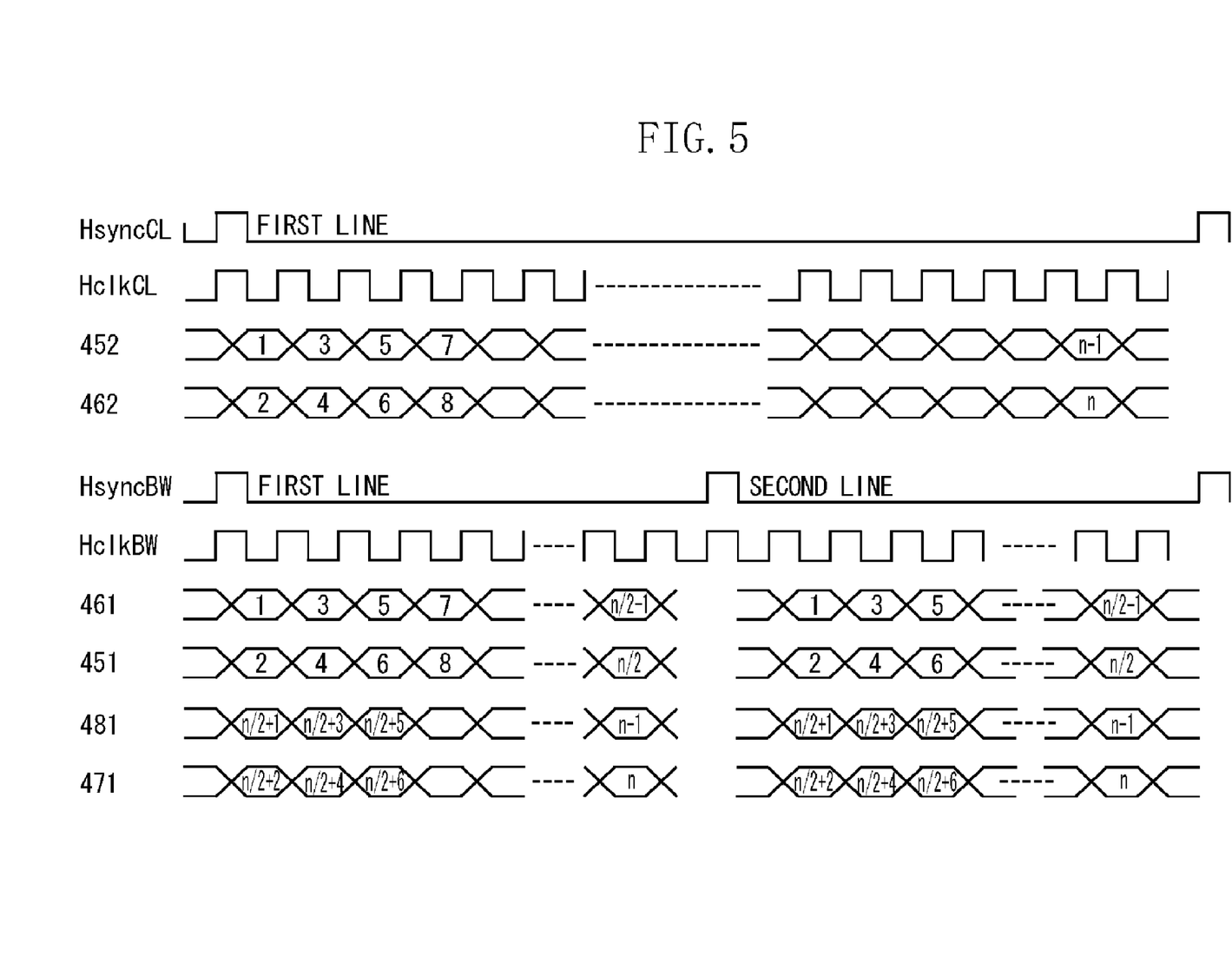
FIG. 5 is a timing chart for a monochromatic or color image signal output by the four-line sensor according to an exemplary embodiment of the present invention.

FIG. 5 is a timing chart for a monochromatic or color image signal output by the four-line sensor 158. In the example illustrated in FIG. 5, the color image signal R is described as a typical example of the color image signals.

Referring to FIG. 5, the light incident on the color line sensor 402 is converted into an electric signal for each accumulation time equivalent to one cycle of the horizontal synchronization signal HsyncCL (i.e., equivalent to one line). The converted signal is then output in synchronization with the pixel clock HclkCL.

The signals of the odd-numbered pixels and the even-numbered pixels of the color line sensor 402 are transferred in parallel. For example, a first pixel and a second pixel are output at the same time.

On the other hand, the light that has been incident on the monochromatic line sensor 401 is converted into an electric signal for each accumulation time equivalent to one cycle of the horizontal synchronization signal HsyncBW, which is half a cycle of the horizontal synchronization signal HsyncCL (i.e., equivalent to one line). The converted signal is then output in synchronization with the pixel clock HclkBW.

The signals of the odd-numbered pixels and the even-numbered pixels of the monochromatic line sensor 401 are transferred in parallel. In addition, the signals of the pixels in the first half and the pixels in the latter half in the main scanning direction of the monochromatic line sensor 401 are transferred in parallel. As a result, four pixels of the monochromatic line sensor 401 are output in parallel.

Let "n" (n is an even number) be the number of pixels in one line. Then, for a first clock, a first, a second, an (n/2+1)-th, and an (n/2+2)-th pixels are output at the same time.

In the above-described manner, the monochromatic line sensor according to the present exemplary embodiment reads two lines in the time taken to read one line by using the color line sensor.

Figure 6:
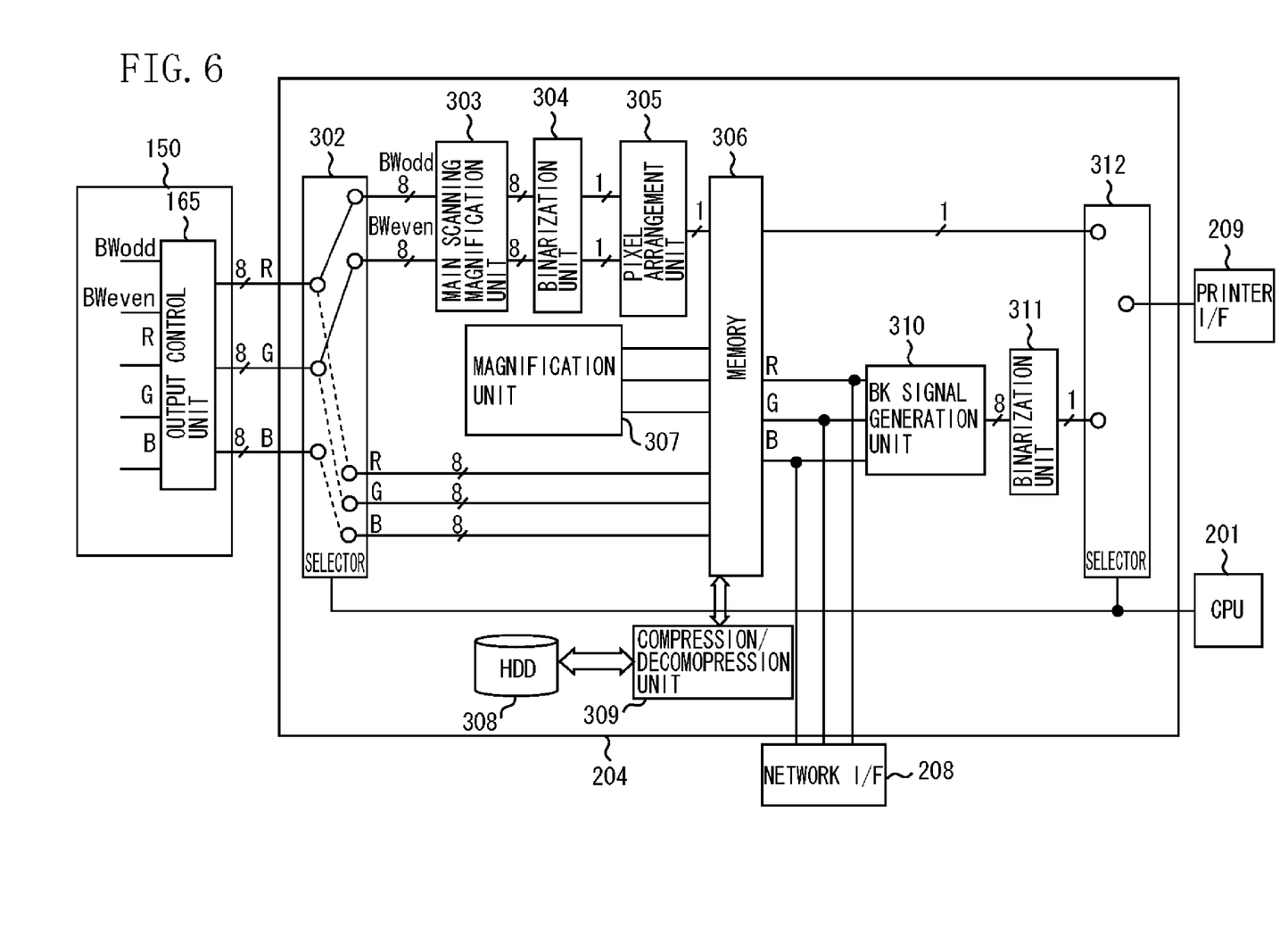
FIG. 6 is a block diagram illustrating an exemplary image processing unit of the image controller according to an exemplary embodiment of the present invention.
Figure 7A:
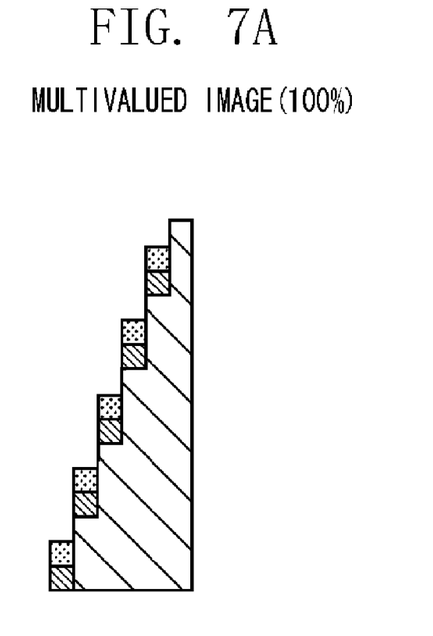
FIGS. 7A, 7B, 7C and 7D illustrates an example of a digitally variable-magnified (enlarged) multivalued image and binary image according to an exemplary embodiment of the present invention.
Figure 7B:
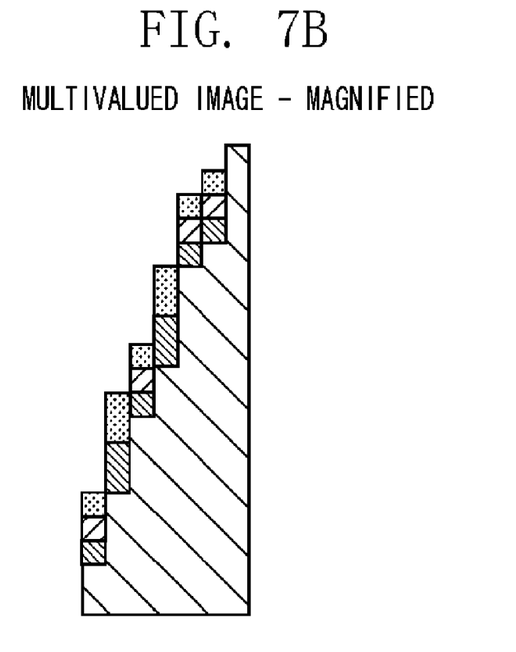
Figure 7C:
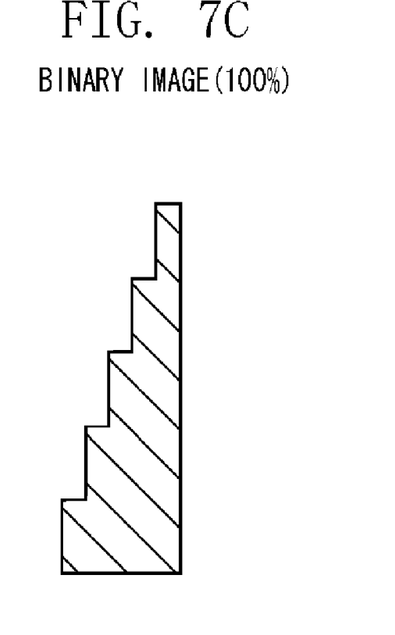
Figure 7D:
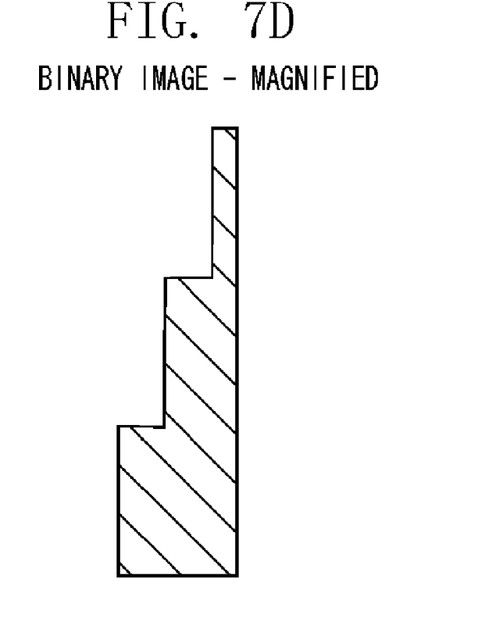

FIG. 6 is a block diagram illustrating an exemplary configuration of the image processing unit 204 of the controller 200.

The image processing unit 204 according to the present exemplary embodiment is, in reading a monochromatic document at a high speed and temporarily storing the read document image on the memory, capable of temporarily storing image data of the larger number of pages than that in the case of reading and temporarily storing a color document. More specifically, the image processing unit 204 binarizes multi-valued image data of a monochromatic document and stores the binary data on the memory. In addition, the image processing unit 204 stores multivalued image data of color documents as it is (without binarizing the same) on the memory.

Accordingly, the image processing unit 204 can store image data of a large number of pages by binarizing and storing image data of a monochromatic document, which primarily includes text data, on the memory having a limited capacity.

However, in executing variable magnification on the monochromatic document image, if the binary image stored on the memory is digitally variable-magnified by interpolating or thinning out the same, then image degradation, which includes a phenomenon of step-like difference on an edge of the image or image blur, may occur.

In order to suppress image degradation and address the above-described problem, in reading a monochromatic document, it is useful to execute variable magnification scanning, in which variable magnification in the sub scanning direction is executed, by reading a document while conveying the document at a speed appropriate for the variable magnification ratio.

In this case, with respect to the variable magnification in the main scanning direction, digital variable magnification by image processing on multivalued data is executed. Because the image processing is executed within one line in the main scanning direction, the variable magnification in the main scanning direction can be executed without storing image data of a plurality of lines.

On the other hand, if the variable magnification scanning is executed in reading a color document, color misregistration may occur in the image due to vibration that may occur in driving the optical system at a low speed during enlargement processing.

In order to solve the above-described problem, the present exemplary embodiment, in reading a color document, executes digital variable magnification in the main scanning direction and the sub scanning direction on a page image stored on the memory. Thus, the present exemplary embodiment can prevent color misregistration.

In the example illustrated in FIG. 6, a monochromatic printer is connected to the printer I/F 209 and a monochromatic binary image is output to the printer.

The document reading apparatus according to the present exemplary embodiment includes a monochromatic document reading mode and a color document reading mode.

In the monochromatic document reading mode, the output control unit 165 executes control for outputting a monochromatic odd-numbered pixel signal BWodd to the line R. In addition, the output control unit 165 executes control for outputting a monochromatic even-numbered pixel signal BWeven to the line G. The pixel signals BWodd and BWeven are multivalued data of 8 bits, respectively. Accordingly, the signal transfer speed in the monochromatic document reading mode is twice as fast as that in the color document reading mode.

In the monochromatic document reading mode, the CPU 201 executes control of a selector 302 to connect the line R to the pixel signal BWodd of a main scanning variable magnification unit 303. In addition, the CPU 201 executes control of a selector 302 to connect the line G to the pixel signal BWeven of the main scanning variable magnification unit 303.

In the monochromatic document reading mode, the main scanning variable magnification unit 303 executes the main scanning variable magnification. In addition, a binarization unit 304 converts 8-bit multivalued data into binary data. Furthermore, a rearrangement unit 305 rearranges the odd-numbered pixels and the even-numbered pixels into one line. The rearranged pixels are stored on a memory 306.

With respect to the variable magnification in the sub scanning direction, scanning variable magnification is executed in reading a document image according to the variable magnification ratio. Accordingly, the data size of a monochromatic document can be reduced. Therefore, the present exemplary embodiment can easily increase the speed of processing data and the memory capacity.

In the monochromatic document reading mode, the CPU 201 executes control of a selector 312 to output the binary data from the memory 306 to the printer I/F 209. The image data stored on the memory 306 is compressed by a compression/decompression processing unit 309. A hard disk drive (HDD) 308 can store the compressed image data. In reading the image data from the HDD 308, the compression/decompression processing unit 309 decompresses the compressed image data and stores the decompressed image data on the memory 306.

In the color document reading mode, the output control unit 165 executes control so that an R output, a G output, and a B output are put out to the line R, the line G, and the line B, respectively. Each of the R output, the G output, and the B output is multivalued data (8-bit each).

In the color document reading mode, the CPU 201 executes control of the selector 302 so that the multivalued data of each of the line R, the line G, and the line B is stored on the memory 306 as it is as multivalued data. More specifically, in the color document reading mode, the CPU 201 stores the 8-bit image signal of each color on the memory 306 to maintain the gradation of the image.

In the color document reading mode, the document is scanned at a constant speed regardless of the variable magnification ratio. A variable magnification unit 307 reads the 8-bit data image of each color, which has been temporarily stored on the memory 306. Then, the variable magnification unit 307 executes the digital variable magnification processing in the main scanning direction and the sub scanning direction.

The present exemplary embodiment executes the above-described digital variable magnification on multivalued data instead of executing it on binary data for the following reasons.

FIG. 7 illustrates an example of a digitally variable-magnified (enlarged) multivalued image and binary image according to the present exemplary embodiment. If multivalued data is digitally variable-magnified, interpolation operation is executed based on multivalued data. Accordingly, a step-like shape in the edge portion of an image is relatively less visible. On the other hand, if binary data is digitally variable-magnified, the image data is enlarged based on the binary data. Accordingly, the step-like shape in the edge portion of an image is relatively visible.

Therefore, the present exemplary embodiment executes the digital variable magnification on multivalued data (if the data is to be binarized, before the binarization of the multivalued data). Thus, the present exemplary embodiment can prevent image degradation that may occur due to enlargement of an image.

In digital variable magnification in the sub scanning direction, the present exemplary embodiment generates an image between lines by interpolation operation. Accordingly, image data of a plurality of lines becomes necessary at the same time. Therefore, in the color document reading mode, in which the digital variable magnification in the main scanning direction and the sub scanning direction is executed, the present exemplary embodiment temporarily stores 100% image data of one page on the memory 306. Then, the present exemplary embodiment reads images of a plurality of lines and executes the variable magnification processing on the read image. The image that has been subjected to the digital variable magnification is stored on the memory 306 again.

In the color document reading mode, the 8-bit three-color signals of R, G, and B, which have been stored on the memory 306, are output to a PC on the network via a network I/F 314. Furthermore, the 8-bit three-color signals of R, G, and B, which have been stored on the memory 306, are converted into monochromatic multivalued data by a black (BK) signal generation unit 310. Then, a binarization unit 311 binarizes the monochromatic multivalued data.

In the color document reading mode, the CPU 201 controls the selector 312 so that the selector 312 outputs the binary data to the printer I/F 209 from the binarization unit 311. If a color printer is connected to the printer I/F 209, a luminance-density conversion unit, which is provided in substitution for the BK signal generation unit 310 and the binarization unit 311, converts the R, G, and B data into multivalued data of yellow (Y), magenta (M), cyan (C), and black (BK).

Figure 8:
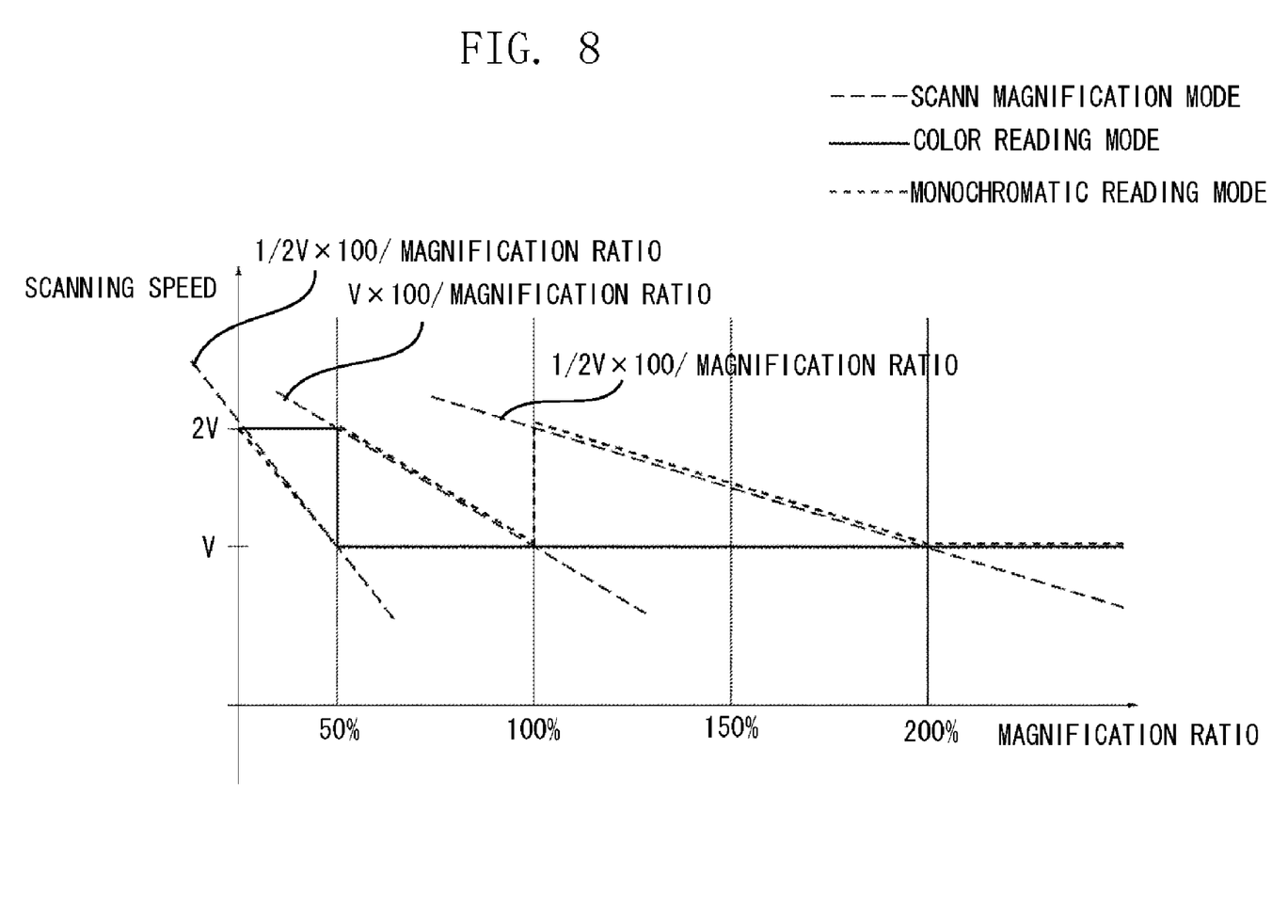
FIG. 8 is a graph illustrating an exemplary relationship between a variable magnification ratio and a scanning speed according to an exemplary embodiment of the present invention.

FIG. 8 is a graph illustrating an exemplary relationship between the variable magnification ratio and the scanning speed according to the present exemplary embodiment. To begin with, the case will be described in detail below where the variable magnification ratio is 100% or higher.

In the color document reading mode, the present exemplary embodiment reads the document at a scanning speed (document conveyance speed) V [mm/sec] regardless of the variable magnification ratio and executes the digital variable magnification in the above-described manner. The scanning speed V of 234 [mm/sec] can be used, for example.

If the variable magnification ratio is 100% in the monochromatic document reading mode, the present exemplary embodiment reads the document at the scanning speed of 2V [mm/sec], which is twice as fast as that of the color document reading mode, as described above. On the other hand, if the variable magnification ratio is higher than 100% in the monochromatic document reading mode, the present exemplary embodiment reads the document at the scanning speed of (2V×(100/variable magnification ratio)) [mm/sec].

As can be known from the graph illustrated in FIG. 8, if the variable magnification ratio is 200% or lower, the scanning speed in the monochromatic document reading mode is higher than that in the color document reading mode. Accordingly, in this case, it takes less time to read a document in the monochromatic document reading mode than in the color document reading mode.

However, if the variable magnification ratio is higher than 200% in the monochromatic document reading mode and if a document is read at the scanning speed of (2V×(100/variable magnification ratio)) [mm/sec], then the scanning speed becomes lower than the scanning speed V [mm/sec]. More specifically, in this case, the scanning speed becomes lower than that in the color document reading mode.

Moreover, vibration may occur in the low speed range depending on the performance of the motor that drives the document conveyance roller. In addition, if a motor and a damper that can be stably driven both in the high speed range and the low speed range are used, the cost of manufacture may increase.

In order to solve the above-described problem, in the present exemplary embodiment, if the variable magnification ratio is higher than 200% in the monochromatic document reading mode (i.e., if the variable magnification ratio is the ratio at which the scanning speed becomes lower than the scanning speed V [mm/sec]), the scanning speed of V [mm/sec] is used. In this case, the present exemplary embodiment executes digital variable magnification on multivalued data in both the main scanning direction and the sub scanning direction.

Accordingly, in the monochromatic document reading mode, the present exemplary embodiment moves the document at the scanning speed equal to or higher than that in the color document reading mode. More specifically, as described above, the present exemplary embodiment executes digital variable magnification on multivalued data instead of executing the digital variable magnification on binary data to prevent image degradation.

As described above, the present exemplary embodiment executes the digital variable magnification even in the monochromatic document reading mode if the scanning speed in the scanning variable magnification is lower than that in the digital variable magnification. Accordingly, in the present exemplary embodiment, the reading productivity in the monochromatic document reading mode does not become lower than that in the color document reading mode.

In the present exemplary embodiment, a boundary line between the scanning variable magnification and the digital variable magnification is 200%. However, the present exemplary embodiment is not limited to this. More specifically, an arbitrary predetermined variable magnification ratio can be used according to the reading productivity levels in the monochromatic document reading mode and the color document reading mode.

Now, the processing executed if the variable magnification ratio is higher than 200% in the monochromatic document reading mode will be described in detail below with reference to the block diagram illustrated in FIG. 6.

If the variable magnification ratio is higher than 200% in the monochromatic document reading mode, the output control unit 165 executes control so that the G output of the color line sensor is put out to each of the line R, the line G, and the line B. This is intended to process the output of the color line sensor as monochromatic image data. In the present exemplary embodiment, the G output is multivalued data of 8-bit, respectively.

The CPU 201 executes control of the selector 302 so that the multivalued data of each of the line R, the line G, and the line B is stored on the memory 306 as it is as multivalued data. In this case, the document is scanned at the constant scanning speed of V [mm/sec] regardless of the variable magnification ratio.

The variable magnification unit 307 reads the 8-bit image data of each color, which has been temporarily stored on the memory 306. In addition, the variable magnification unit 307 executes the digital variable magnification in the main scanning direction and the sub scanning direction. The image that has been subjected to the digital variable magnification is stored on the memory 306 again.

Then, the BK signal generation unit 310 reads the G signal from the memory 306 and converts the same into monochromatic multivalued data. Furthermore, the binarization unit 311 binarizes the converted multivalued data. The binary data is then output from the printer I/F 209 via the selector 312.

If the image data is output to a PC on the network, because all of the image data from the line R, the line G, and the line B is the image data of the G output, the monochromatic multivalued data is output to the PC on the network via the network I/F 314.

Now, the processing executed if the variable magnification ratio is lower than 100% will be described in detail below with reference to FIG. 8.

If the variable magnification ratio is lower than 100% in the monochromatic document reading mode and if it is desired that the scanning speed is controlled in the similar manner as in the case where the variable magnification ratio is equal to or higher than 100%, then it is necessary to set the scanning speed higher than the scanning speed 2V because the scanning speed is determined by the expression "2V×(100/variable magnification ratio) [mm/sec]" as described above.

However, if a motor and a damper that can be stably driven both in the high speed range and the low speed range are used in the motor that drives the document conveyance roller, the cost of manufacture may increase.

In order to prevent the above-described problem, in the present exemplary embodiment, if the variable magnification ratio is equal to or higher than 50% and lower than 100% in the monochromatic document reading mode, the document is read at the scanning speed (V×(100/variable magnification ratio)) [mm/sec]. Furthermore, in this case, the main scanning variable magnification unit 303 executes the variable magnification in the main scanning direction. In addition, in outputting the binary data from the memory 306, the present exemplary embodiment executes the digital variable magnification at the variable magnification ratio of 50% in the sub scanning direction (i.e., the present exemplary embodiment thins out one line of the two lines in this case). More specifically, the present exemplary embodiment executes the scanning variable magnification and the digital variable magnification in combination in the sub scanning direction.

In the present exemplary embodiment, although the digital variable magnification is executed on binary data, the image quality is resistant to degradation because the present exemplary embodiment executes reduction variable magnification at the variable magnification ratio of 50%.

Accordingly, the present exemplary embodiment can execute reduction zooming in the monochromatic document reading mode without using the scanning speed higher than the scanning speed 2V. In addition, in the present exemplary embodiment having the configuration described above, the reading productivity in the monochromatic document reading mode does not becomes lower than the reading productivity in the color document reading mode.

In the monochromatic document reading mode, if the variable magnification ratio is equal to or higher than 25% and lower than 50% and if the scanning speed (V×(100/variable magnification ratio)) [mm/sec] is used, a problem similar to that document reading apparatus may arise. Accordingly, the present exemplary embodiment uses the scanning speed (½× V×(100/variable magnification ratio)) [mm/sec].

In this case, in outputting the binary data that has been stored on the memory 306, the present exemplary embodiment executes digital variable magnification in the sub scanning direction at the variable magnification ratio of 25% (i.e., the present exemplary embodiment thins out three lines from the four lines).

If the variable magnification ratio is equal to or higher than 25% and lower than 50% in the color document reading mode, the present exemplary embodiment uses the scanning speed of 2V [mm/sec] and executes digital variable magnification on multivalued data. In this case, the present exemplary embodiment executes the digital variable magnification in the sub scanning direction at double the variable magnification ratio. More specifically, in this case, the present exemplary embodiment executes 50 digital variable magnification if the variable magnification ratio is 25%.

With the above-described configuration, the present exemplary embodiment can suppress wasteful use of the capacity of the memory 306 in temporarily storing the multivalued data that has not been subjected to the digital variable magnification yet, which may otherwise occur due to an excessively large amount of the multivalued data before the digital variable magnification when the amount of multivalued data after the digital variable magnification becomes small.

Figure 9:
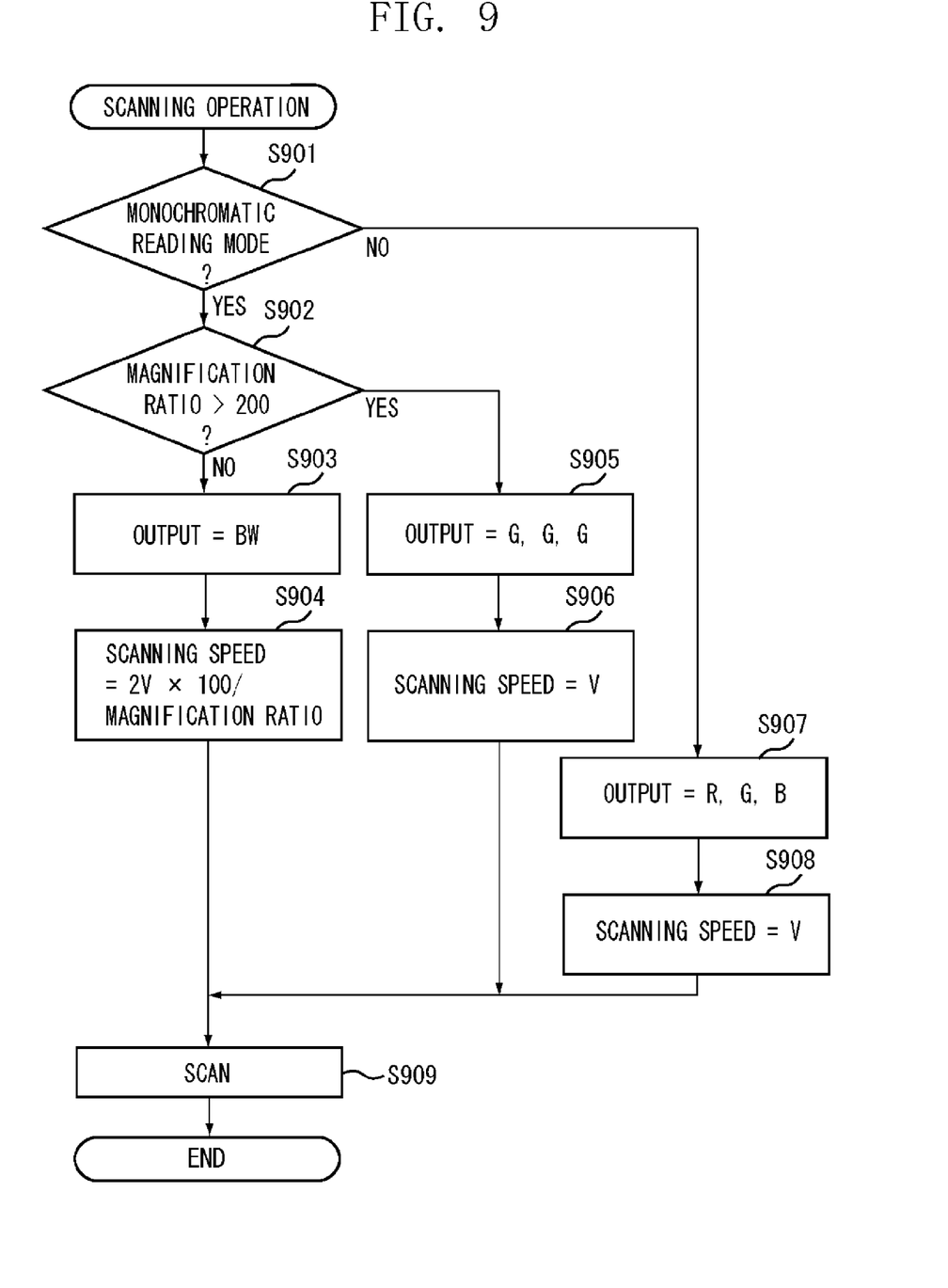
FIG. 9 is a flow chart illustrating exemplary processing for controlling the scanning speed of the ADF and the reader unit according to an exemplary embodiment of the present invention.

FIG. 9 is a flow chart illustrating exemplary control on the scanning speed of the ADF 100 and the reader unit 150 according to the present exemplary embodiment. The flowchart of the processing illustrated in FIG. 9 is executed by the CPU 161 of the reader unit 150. In the flow chart illustrated in FIG. 9, only the control executed if the variable magnification ratio is 100% or higher is illustrated for easier understanding.

Referring to FIG. 9, when the user issues an instruction for starting a scanning operation, the processing starts. In step S901, the CPU 161 determines whether the user has designated the monochromatic document reading mode via the image controller 200. If it is determined that that the user has designated the color document reading mode (NO in step S901), then the processing advances to step S907. In step S907, the CPU 161 executes control on the output control unit 165 so that the R output, the G output, and the B output are put out from the output control unit 165 to the line R, the line G, and the line B, respectively. In step S908, the CPU 161 sets the scanning speed to V [mm/sec].

On the other hand, if it is determined that the user has designated the monochromatic document reading mode via the image controller 200 (YES in step S901), then the processing advances to step S902. In step S902, the CPU 161 determines whether the variable magnification ratio designated by the user via the image controller 200 is higher than 200%.

If it is determined that the variable magnification ratio designated by the user via the image controller 200 is equal to or lower than 200% (lower than a predetermined variable magnification ratio) (NO in step S902), then the processing advances to step S903. In step S903, the CPU 161 controls the output control unit 165 so that a monochromatic odd-numbered pixel signal BWodd is output to the line R from the output control unit 165 and that a monochromatic even-numbered pixel signal is output to the line G from the output control unit 165. Furthermore, the CPU 161 sets the scanning speed to (2V×(100/variable magnification ratio)) [mm/sec].

On the other hand, if it is determined that the designated variable magnification ratio is higher than 200% (YES in step S902), then the processing advances to step S905. In step S905, the CPU 161 controls the output control unit 165 so that a G output from the color line sensor is put out to all of the lines R, G, and B. In addition, the CPU 161 sets the scanning speed to V [mm/sec].

After setting the scanning speed in steps S904, S906, and S908, the processing advances to step S909. In step S909, the CPU 161 starts the scanning operation.

Figure 10:
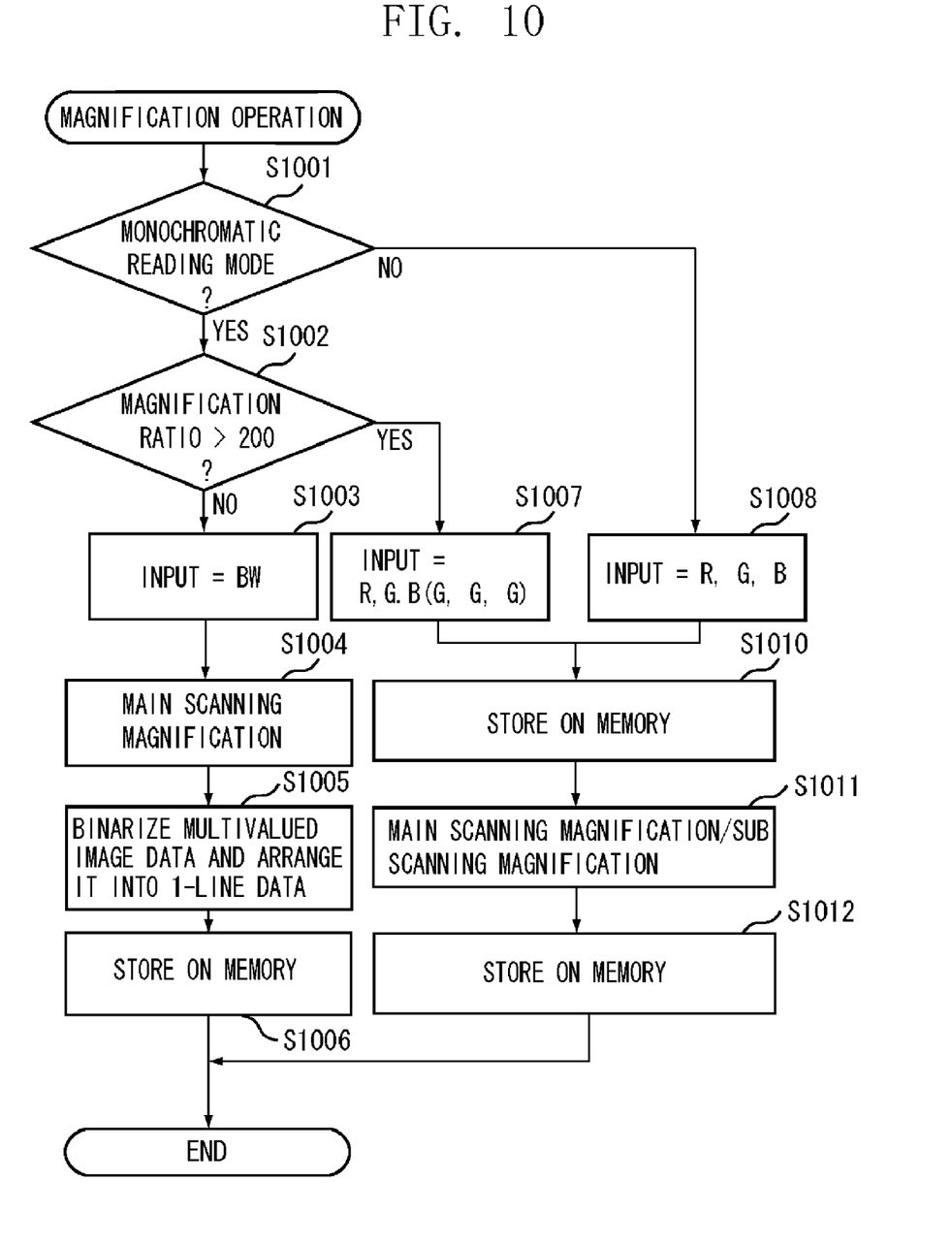
FIG. 10 is a flow chart illustrating an example of processing executed by the image controller for executing variable magnification on a read image and storing the magnified image on a memory according to an exemplary embodiment of the present invention.

FIG. 10 is a flow chart illustrating an example of processing executed by the image controller 200 for executing the variable magnification on the read image and storing the magnified image on the memory. The processing of the flowchart illustrated in FIG. 10 is executed by the CPU 201 of the image controller 200. In the flow chart illustrated in FIG. 10, the control executed if the variable magnification ratio is 100% or higher only is illustrated for easier understanding.

Referring to FIG. 10, in step S1001, the CPU 201 determines whether the user has designated the monochromatic document reading mode. If it is determined that the user has designated the color document reading mode (NO in step S1001), then the processing advances to step S1008. In step S1008, R, G, and B multivalued data is input. In step S1010, the CPU 201 stores the input R, G, and B multivalued data on the memory 306.

In step S1011, the CPU 201 reads the image data from the memory 306 and executes the digital variable magnification in the main scanning direction and the sub scanning direction by using the variable magnification unit 307. In step S1012, the CPU 201 stores the magnified image data on the memory 306 again.

On the other hand, if it is determined that the user has designated the monochromatic document reading mode (YES in step S1001), then the processing advances to step S1002. In step S1002, the CPU 201 determines whether the variable magnification ratio is higher than 200%.

If it is determined that the variable magnification ratio is equal to or lower than 200% (NO in step S1002), then the processing advances to step S1003. In step S1003, multivalued data BWodd and BWeven is input. In step S1004, the CPU 201 executes the variable magnification on the BWodd and BWeven in the main scanning direction.

In step S1005, the CPU 201 binarizes the multivalued data and rearranges the binary data into one line data. In step S1006, the CPU 201 stores the rearranged data on the memory 306.

On the other hand, if it is determined that the variable magnification ratio is higher than 200% (YES in step S1002), then the processing advances to step S1007. In step S1007, G multivalued data is input via the lines R, G, and B. In step S1010, the CPU 201 stores the input multivalued data on the memory 306.

In step S1011, the CPU 201 reads the image data from the memory 306 and executes the digital variable magnification in the main scanning direction and the sub scanning direction by using the variable magnification unit 307. In step S1012, the CPU 201 stores the magnified image data on the memory 306 again.

In the present exemplary embodiment, change of the variable magnification between the scanning variable magnification and the digital variable magnification in the monochromatic document reading mode is determined on the basis of a result of comparison between the scanning speed in the monochromatic document reading mode and that in the color document reading mode.

However, the present exemplary embodiment is not limited to this. More specifically, it is also useful if the change of the variable magnification is determined additionally on the basis of the time necessary for the digital variable magnification by the variable magnification unit 307 and the time necessary for inputting and outputting the image data to and from the memory 306 so that the reading productivity in the monochromatic document reading mode does not become lower than that in the color document reading mode.

In the present exemplary embodiment, the feeding-reading scanning operation, in which the ADF 100 feeds and reads the document, is described. However, the present exemplary embodiment is not limited to this. More specifically, the present exemplary embodiment can be implemented if the scanner unit 159 is reciprocated to read a document on the platen glass 152.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-274349 filed Oct. 24, 2008, which is hereby incorporated by reference herein in its entirety.

What is claimed is:

1. A document reading apparatus comprising:
   a reading unit configured to read an image of a document and output multivalued data of the read image of the document;
   a moving unit configured to relatively move the document and the reading unit;
   a storage unit configured to store multivalued data or binary data of the image of the document; and
   a control unit configured, in reading the image of the document in a monochromatic document reading mode, to execute magnification by causing the reading unit to read the document while the moving unit relatively moves the document and the reading unit at a speed determined according to a magnification ratio,
   binarize the multivalued data output from the reading unit and store the binary data on the storage unit and configured, in reading an image of the document in a color document reading mode, to execute magnification on data output from the reading unit by causing the reading unit to read the document while the moving unit relatively moves the document and the reading unit at a predetermined speed, and store the multivalued data output from the reading unit on the storage unit and executed magnification on the multivalued data stored on the storage unit.

2. The document reading apparatus according to claim 1, wherein the control unit is configured, if magnification is executed at an enlargement magnification ratio higher than a predetermined enlargement magnification ratio in the monochromatic document reading mode, to read the document by using the reading unit while the moving unit relatively moves the document and the reading unit at the predetermined speed, to store the multivalued data output by the reading unit on the storage unit, and to execute the variable magnification on the multivalued data stored on the reading unit.

3. The document reading apparatus according to claim 2, wherein the predetermined enlargement magnification ratio is a magnification ratio used when the document and the reading unit are relatively moved at the predetermined speed in reading an image of the document in the monochromatic document reading mode.

4. The document reading apparatus according to claim 3, wherein the control unit is configured, in the monochromatic document reading mode, to execute control to relatively move the document and the reading unit by using the moving unit at a speed equal to or higher than a speed in the color document reading mode.

5. The document reading apparatus according to claim 4, wherein the control unit is configured, if the variable magnification ratio is 100% in the monochromatic document reading mode, to relatively move the document and the reading unit by using the moving unit at a speed twice as high or higher than a speed in the color document reading mode.

6. The document reading apparatus according to claim 5, wherein the reading unit is configured, if the enlargement magnification ratio is equal to or lower than the predetermined enlargement magnification ratio in the monochromatic document reading mode, to output multivalued data of a transfer amount twice as large or larger than a transfer amount in the color document reading mode.

7. The document reading apparatus according to claim 1, further comprising a magnification unit configured to execute magnification on the multivalued data output from the reading unit in the monochromatic document reading mode in a direction perpendicular to a direction of the movement.

8. The document reading apparatus according to claim 1, wherein the moving unit is configured to move the document relative to the reading unit.

9. The document reading apparatus according to claim 1, wherein the moving unit is configured to move the reading unit relative to a document placing plate, on which the document is placed.

10. The document reading apparatus according to claim 1, wherein
the reading unit includes a color line sensor and a monochromatic line sensor whose light-receiving amount is larger than a light-receiving amount of the color line sensor, and
wherein the reading unit is configured to output multivalued data based on an output from the color line sensor in the color document reading mode and configured to output multivalued data based on an output from the monochromatic line sensor in the monochromatic document reading mode.

11. The document reading apparatus according to claim 2, wherein
the reading unit includes a color line sensor and a monochromatic line sensor whose light-receiving amount is larger than a light-receiving amount of the color line sensor, and
wherein the reading unit is configured to output multivalued data based on an output from the color line sensor in the color document reading mode, and if magnification is executed in the monochromatic document reading mode at an enlargement magnification ratio equal to or lower than the predetermined enlargement magnification ratio, to output multivalued data based on an output from the monochromatic line sensor, and if magnification is executed in the monochromatic document reading mode at an enlargement magnification ratio higher than the predetermined enlargement magnification ratio, to output multivalued data based on an output of the color line sensor.

12. The document reading apparatus according to claim 1, wherein
the reading unit includes three data lines configured to output multivalued data of an image of the document, and
wherein the reading unit is configured to output multivalued data of red, green, and blue to the three data lines in the color document reading mode and configured to output monochromatic multivalued data to two of the three data lines in the monochromatic document reading mode.

13. The document reading apparatus according to claim 2, wherein
the reading unit includes three data lines configured to output multivalued data of an image of the document, and
wherein the reading unit is configured to output multivalued data of red, green, and blue to the three data lines in the color document reading mode, and if magnification is executed in the monochromatic document reading mode at an enlargement magnification ratio equal to or lower than the predetermined enlargement magnification ratio, to output monochromatic multivalued data to two of the three data lines, and if magnification is executed in the monochromatic document reading mode at an enlargement magnification ratio higher than the predetermined enlargement magnification ratio, to output multivalued data of green to the three data lines.

14. A document reading apparatus comprising:
a reading unit, including a monochromatic line sensor and a color line sensor, configured to read a document while moving the document or a scanner unit at a set scanning speed, time to transfer monochromatic image data equivalent to one line read by the monochromatic line sensor being shorter than time to transfer color image data equivalent to one line ready by the color sensor, and a first scanning speed in a monochromatic reading mode being faster than a second scanning speed in a color reading mode when a magnification ratio is 100%,
a quantization unit for quantizing the monochromatic image data;
a magnification unit for varying a magnification of the color image data;
a setting unit for setting a scanning speed based on a reading mode and the magnification ratio, wherein, when a document is read in a monochromatic reading mode and the magnification ratio is equal to or smaller than a predetermined magnification ration, the setting unit sets the scanning speed according to the magnification ratio and the first scanning speed, the reading unit reads the document using the monochromatic line sensor while moving the document or the scanner unit at the set scanning speed, and the quantization unit quantizes the monochromatic image data of the document, wherein, when the document is read in a color reading mode and the magnification ratio is larger than the predetermined magnification ratio, the setting unit sets the second scanning speed, the reading unit reads the document using the color sensor while moving the document or the scanner unit at the second scanning speed, and the magnification unit varies the magnification, and wherein, when the document is read in a monochromatic reading mode, the setting unit sets the second scanning speed, the reading unit reads the document using the color sensor while moving the document or the scanner unit at the second scanning speed, and the magnification unit varies the magnification.

15. The document reading apparatus according to claim 14, further comprising a storage unit configured to store the quantized monochromatic image data and the color image data, wherein the magnification unit varies the magnification of the stored color image data.

16. The document reading apparatus according to claim 14, wherein the color line sensor includes red, green, and blue line sensors, and wherein, when the document is read in a monochromatic reading mode and the magnification ratio is larger than the predetermined magnification ratio, the reading unit reads the document using the green line sensor while moving the document or the scanner unit at the second scanning speed, and the magnification unit varies a magnification of green image data.

* * * * *